United States Patent
Ganesan et al.

(10) Patent No.: US 12,262,075 B2
(45) Date of Patent: Mar. 25, 2025

(54) METHODS AND SYSTEMS FOR STREAMING IN FLAKY NETWORK

(71) Applicant: DISH Network Technologies India Private Limited, Bangalore (IN)

(72) Inventors: Vimalraj Ganesan, Bangalore (IN); Amit Kumar, Bangalore (IN); Deepak Sharma, Bangalore (IN)

(73) Assignee: DISH Network Technologies India Private Limited, Bangalore (IN)

( * ) Notice: Subject to any disclaimer, the term of this patent is extended or adjusted under 35 U.S.C. 154(b) by 0 days.

(21) Appl. No.: 18/308,520

(22) Filed: Apr. 27, 2023

(65) Prior Publication Data

US 2024/0364953 A1    Oct. 31, 2024

(51) Int. Cl.
  *H04N 21/2662* (2011.01)
  *H04N 21/2187* (2011.01)
  *H04N 21/24* (2011.01)
  *H04N 21/4147* (2011.01)

(52) U.S. Cl.
  CPC ..... *H04N 21/2662* (2013.01); *H04N 21/2187* (2013.01); *H04N 21/2401* (2013.01); *H04N 21/4147* (2013.01)

(58) Field of Classification Search
  CPC ......... H04N 21/23439; H04N 21/2402; H04N 21/8456; H04N 21/44209; H04N 21/2662; H04N 21/44004; H04N 21/64738
  See application file for complete search history.

(56) References Cited

U.S. PATENT DOCUMENTS

| | | | |
|---|---|---|---|
| 7,647,614 B2 | 1/2010 | Krikorian et al. | |
| 7,707,614 B2 | 4/2010 | Krikorian et al. | |
| 7,818,444 B2 | 10/2010 | Brueck et al. | |
| 7,877,776 B2 | 1/2011 | Krikorian et al. | |
| 7,917,932 B2 | 3/2011 | Krikorian | |
| 8,683,066 B2 | 3/2014 | Hurst et al. | |
| 8,868,772 B2 | 10/2014 | Major et al. | |
| 9,137,285 B2* | 9/2015 | Mamidwar | H04L 65/752 |
| 2003/0200337 A1* | 10/2003 | Jabri | H04L 65/1104 |
| | | | 375/E7.025 |
| 2010/0299552 A1* | 11/2010 | Schlack | H04N 21/2404 |
| | | | 709/224 |
| 2011/0091025 A1* | 4/2011 | Francisco | H04L 12/2834 |
| | | | 379/93.02 |

* cited by examiner

*Primary Examiner* — Jason Salce
(74) *Attorney, Agent, or Firm* — Perkins Coie LLP

(57) ABSTRACT

A technique is directed to methods and systems for live streaming. In some implementations, the method includes (1) monitoring, by a bitrate feedback extension (BFE) module, a bitrate for a client device during a live streaming process; (2) in response to a bitrate change during the live streaming process, notifying, by the BFE module, the bitrate change to a buffer switch handler (BSH) module; (3) sending, by the BSH module, a request to adjust the bitrate for the client device to a media engine; and (4) switching, based on the request, a media source of the live streaming process.

20 Claims, 8 Drawing Sheets

METHODS AND SYSTEMS FOR STREAMING IN FLAKY NETWORK

BACKGROUND

Streaming technology has been widely used for video transmission in a real-time or near real-time manner. Qualities of streaming services highly rely on network stability and speed. Adaptive bitrate streaming (or "adaptive streaming") technology has been designed to deliver video in the most efficient way possible and in the highest usable quality for each specific user and device. For conventional streaming systems, it is a challenge to support adaptive streaming, especially under "flaky" or unstable network conditions. When a network transmission is "flaky" or unstable, client devices are not able to pull pre-encoded, buffered data at predetermined bitrates, which causes buffering problems and data drops during streaming. Therefore, it is advantageous to have an improved system and method to address the foregoing needs.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

The present disclosure are directed to methods and systems for video streaming. More particularly, systems and methods for handling smooth playback of live or DVR (digital video recorder) content when streaming, without data loss, under an unstable network condition are provided. The present system provides a smooth playback experience on a flaky network without any data loss or discontinuity in playback.

The present system includes a media engine, a media buffer, a tuner, a storage device, and a buffer switch handler (BSH) module. The media engine is configured to receive live streaming data from the tuner and DVR content from the storage device. The media engine is configured to transcode streaming data. The streaming data can be stored in the media buffer (the "buffered data") and then sent to a client device for streaming. The media buffer can include a bitrate feedback module configured to set a bitrate for the media engine based on a rate at which the streaming data is consumed by the client.

The BSH module is configured to (1) manage and/or update a media source (e.g., instructing the media engine switch from the turner to a new file location/position) for streaming when a network transmission speed is unstable; and (2) manage and/or monitor a current bitrate of multiple media sources via a bitrate feedback extension (BFE) module.

In an unstable or "flaky" network environment, if the client device is unable to pull the streaming data at a speed that the media engine generates the streaming data, then the BSH module can request the media engine to transcode the entire buffered data with a lower bitrate, instead of letting the buffered data in the media buffer be flushed so as to cause data drop and discontinued streaming to the client device. In some embodiments, the lower bitrate can be a bitrate that the streaming data can be continuously transmitted to the client device. In some embodiments, the lower bitrate can be determined based on feedback from the BFE module. By the foregoing arrangement, the present systems can effectively handle streaming under an unstable network condition without interruption.

Figure 1:
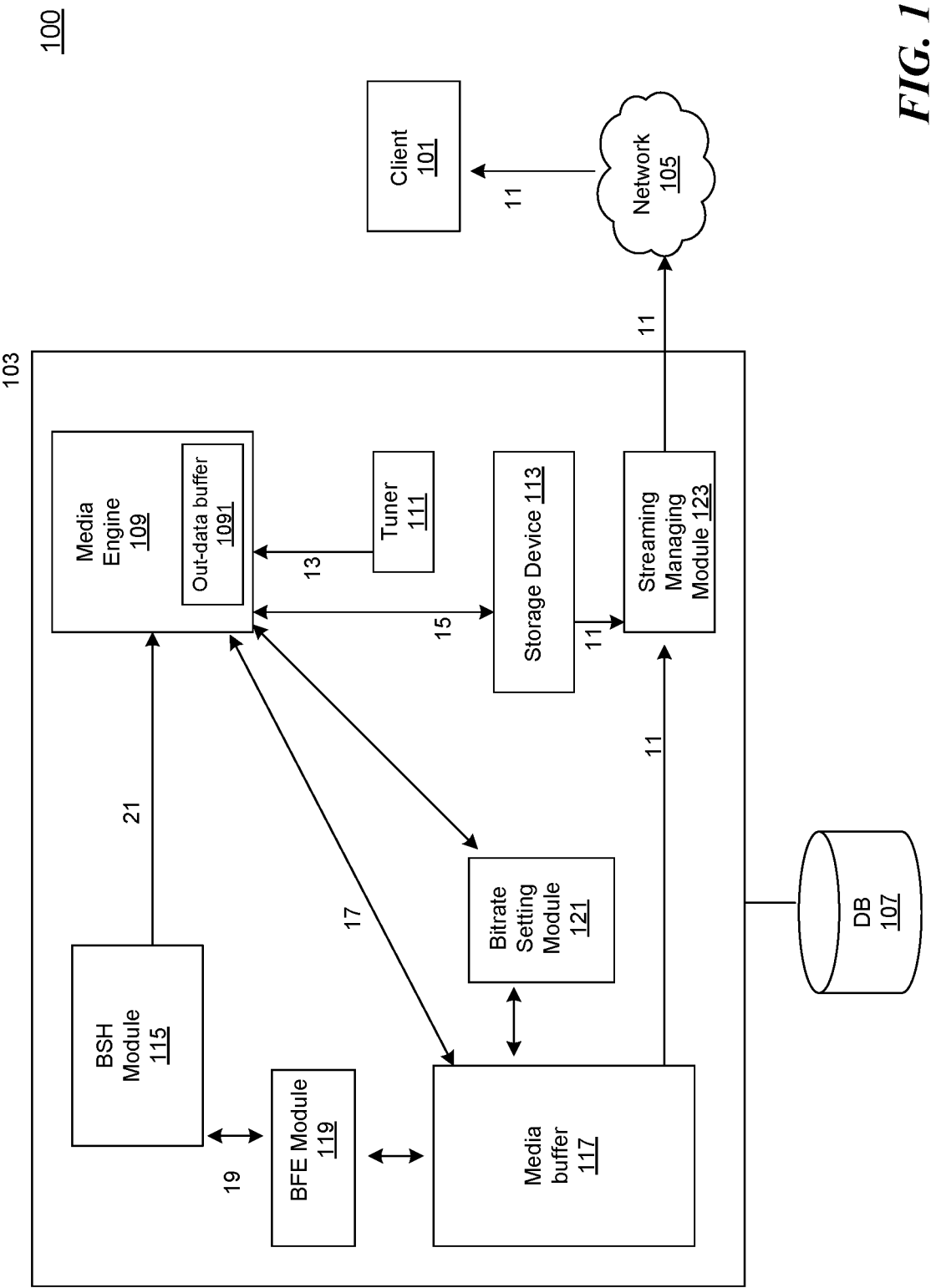
FIG. 1 is a schematic diagram illustrating a system for streaming in accordance with some implementations of the present disclosure.

Several implementations are discussed below in more detail in reference to the figures. FIG. 1 is a schematic diagram illustrating a system 100 for video streaming. The system 100 includes a client device 101 in communication with a streaming server 103 via a network 105. The client device 101 is configured to receive streaming data 11 from the streaming server 103 via the network 105. In some embodiments, the network 105 can be the Internet. In some embodiments, the network 105 can be a 5G network or a satellite network.

In some embodiments, the streaming data 11 can include images, videos, pictures, etc., as well as other suitable, supplemental information associated with the images, such as descriptions, metadata, credits, sources, providers, links, descriptions, comments, etc. The streaming server 103 can further connect to a database 107. The database 107 is configured to store data and information such as the streaming data 11 and other associated information, data analyzed or trained by the streaming server 103, user profile information (e.g., user preferences, user subscription plans, types or configurations of user devices, etc.) and/or other suitable information.

The streaming server 103 includes a media engine 109, a tuner 111, a storage device 113, a buffer switch handler (BSH) module 115, a media buffer 117, and a bitrate feedback extension (BFE) module 119. In some embodiments, the streaming server 103 can further include a bitrate setting/feedback module 121 and a streaming managing module 123. The streaming managing module 123 is configured to interface and coordinate a streaming process with the client device 101.

The media engine 109 is configured to receive live streaming data 13 from the tuner 111 and DVR content 15 from the storage device 113. In some embodiments, the storage device 113 can be a hard disk drive (HDD) or a cloud drive. The media engine 109 is also configured to transcode buffered data 17 from the media buffer 117 so as to generate the streaming data 11 for streaming. In some embodiments, the bitrate setting/feedback module 121 can be included in the media buffer 117. In some embodiments, the bitrate setting/feedback module 121 can be independent from the media buffer 117. The bitrate setting/feedback module 121 can be configured to set a bit rate for the media engine 109 based on a rate at which the streaming data 11 is consumed by the client device 101.

The BSH module 115 is configured to manage and/or update a media source (e.g., instructing the media engine 109 switch from the turner 111 to a new file location/position in the media buffer 117) for streaming in response to a triggering event. In some embodiments, the triggering event includes a network interruption, a slow network transmission, an event that a network transmission speed is lower than a threshold, an event that a network transmission speed variance exceeding a variance threshold.

In some embodiments, the BSH module 115 is also configured to manage and/or monitor a current bitrate 19 for the client device 101 from multiple media sources (e.g., buffered data in the media buffer 117) via the BFE module 119. It is advantageous to have the BFE module 119 to monitor the current bitrate 19 such that the system 100 can be adaptive to the current bitrate 19 (e.g., at run time based on a bandwidth of the client device 101. By such arrangement, the system 100 does not need to transcode with multiple bitrates, which can be challenging due to limited computing resources and storage spaces.

In some embodiments, the BFE module 119 is configured to sense a data flush situation of the system 100. For example, the BFE module 119 can monitor the media buffer 117 or an out-data buffer 1091 of the media engine 109. The out-data buffer 1091 is used for temporarily storing output data of the media engine 109.

When the network condition is stable or good, the media buffer 117 stores transcoded data with fixed bitrate (e.g., 8 megabytes per second, Mbps). When the network condition is unstable (e.g., a drop of bandwidth, such as dropping to 1 Mbps), the media buffer 117 starts filling up faster because the media engine 109 keeps generating data at the original fixed rate (i.e., 8 Mbps) but the client device now only has a new bandwidth of pulling the data at a lower bitrate (i.e., 1 Mbps). The bitrate setting/feedback module 121 can be configured to identify the foregoing bandwidth drop and send a request to the media engine 109 to start transcoding data at the lower bitrate (i.e., 1 Mbps).

In some embodiments, the setting/feedback module 121 can only address a bitrate change in the media engine 109 but not in the media buffer 117. In such embodiments, the BFE module 119 can be configured to communicate with the BSH module 115 and address the bitrate change in the media buffer 117, as discussed in detail below. In some embodiments, the BFE module 119 and the setting/feedback module 121 can be integrated as one component.

When the client device 101 performs a live streaming, live input data is from the tuner 111. The tuner 111 can store the live input data in the storage device 113, and the storage device 113 can perform as a time shift buffer (TSB). The TSB can be used to support pause/play/seek operations in the live streaming. During the live streaming, it is assumed that when a network bandwidth drop happens, the client device 101 is not able to pull the live input data at the current bitrate.

Instead of flushing out the buffered data in the media buffer 117, the BSH module 115 can switch the live streaming to the TSB at the same playback position (e.g., at the time when the network bandwidth drop happens). The BSH module 115 can send a request 21 to the media engine 109 to transcode the entire buffered data (in the media buffer 117) with a lower bitrate based on feedback from the BFE module 119. In some embodiments, the BSH module 115 can start transcoding data from the TSB from the last discontinued position (e.g., at the time when the network bandwidth drop happens). In some embodiments, the BSH module 115 can instruct the media engine 109 to start transcoding data from the TSB from the last discontinued position. By the foregoing arrangement, the existing buffered data (e.g., in the media budder 117) is discarded but the same data is transcoded back from the TSB accordingly to the current network bandwidth, such that a user of the client device 101 does not experience any data drop during livestreaming playback.

In some embodiments, the BSH module 115 can monitors a flush situation of the media buffer 117 and handles upcoming data for transcoding. In some embodiments, the BSH module 115 can receive a transcode notification from the BFE module 119 with one or more of the following: a new transcode start PTS (Presentation Time Stamp), a new transcoding bitrate, etc. In some embodiments, the BFE module 119 can check the media buffer 117 for the new transcoding start PTS. In some embodiments, required data for transcoding can be found at, for example, (1) transcoded/buffered data in the media buffer 107; (2) data in the TSB; and/or (3) data from DVR files, depending on the availability of the storage device 113 and the current playback mode, as discussed in detail below.

Case A: Live Streaming Without Storage Availability (e.g., Without TSB)

If the storage device 113 (the TSB) is not available to buffer input data for the live streaming, requested PTS data (including the new transcode start PTS and associated information) can be found in the media buffer 117 (transcoded, buffered data).

In some embodiments, the requested PTS data can be found by accessing an I-frame look-up table for the transcoded data. For example, the I-frame look-up table can keep an I-frame PTS value and its corresponding transcoded data start address. In such embodiments, the BSH module 115 calls the media engine 109 to stop the current transcoding sessions and initiates a "trans-rater" process (or a re-transcoding process) starting from the requested PTS data available in the transcoded buffer (e.g., the media buffer 117).

This trans-rater process performs in a "super" real time mode and can re-transcode the data very quickly (compared to a duration of the data). For example, a requirement can be to re-transcode "X" seconds of data. When the "super" real time mode is used, the "X" seconds of data will be trans-rated in "Y" seconds, where Y is much smaller than "X."

In some embodiments, when the trans-rater process is complete, the BSH module 115 calls the media engine 109 and stops the trans-rater process. The BSH module 115 can then the initiate a "transcoder" session to start transcoding from the live input data directly coming to the media engine 109.

In some embodiment, in an event that the live input data available in the media engine 109 is to be flushed out, the media engine 109 notifies the BSH module 115 to stop the "trans-rater" process.

Case B: Live Streaming with Storage Availability (e.g., with TSB)

When the storage device 113 is available and can function as the TSB, the TSB can be maintained to enable operations such as pause, resume, seek, trick plan/mode (e.g., a feature that mimics fast-forward and rewind operations), etc. In some embodiments, the TSB can hold "X" seconds of data in a circular buffer fashion. In some embodiments, the storage device 113 can be an internal storage device (e.g., a double data rate (DDR) memory) and/or an external storage device (e.g., SSD, HDD, cloud storages, AWS S3 bucket etc.) In some embodiments, the TSB can hold the data in the input data format. By this arrangement, the system can provide adaptive streaming based on a network throttling bitrate (e.g., a bit-rate that the client device 101 can pull data at) with a possible, high quality.

The BSH module 115 can be configured to request the media engine 109 to transcode the entire buffered data (e.g., in the media buffer 117) with a lower bitrate based on feedback from the BFE module 119. The BSH module 115 can also be configured to transcode data from a file (e.g., from a discontinued PTS position). The BSH module 115 can switch playback to the TSB, without flushing the media buffer 117.

In some embodiments, during a "tuner to file" playback transition, the live streaming of the client device 101 can fall behind. In such cases, the client device 101 can control its play rate (e.g., more than 100% of the bitrate that the client device 101 can handle) at client side so as to catch up until it reaches live streaming.

Case C: DVR Playback Streaming (e.g., Recorded Media Content)

The BSH module 115 can request the media engine 109 to transcode the entire buffered data (e.g., in the media buffer 117) from the discontinued position from a DVR file with a bitrate proposed by the BFE module 119 based on a current network bandwidth of the client device 101. The existing buffered data (e.g., in the media buffer 117) can be deleted and the same data can be transcoded with the proposed bitrate. By this arrangement, a user of the client device 101 does not observe any data drop during playback. In some embodiments, the process of transcoding the entire buffer to a new bitrate consumes a short period of time (e.g., a few seconds), depending on hardware capacity, device/platform performance, etc. In such cases, the client device 101 may be behind live by a few seconds. The system 100 can handle this by adjusting the playing bitrate for the client device 101.

Figure 2:
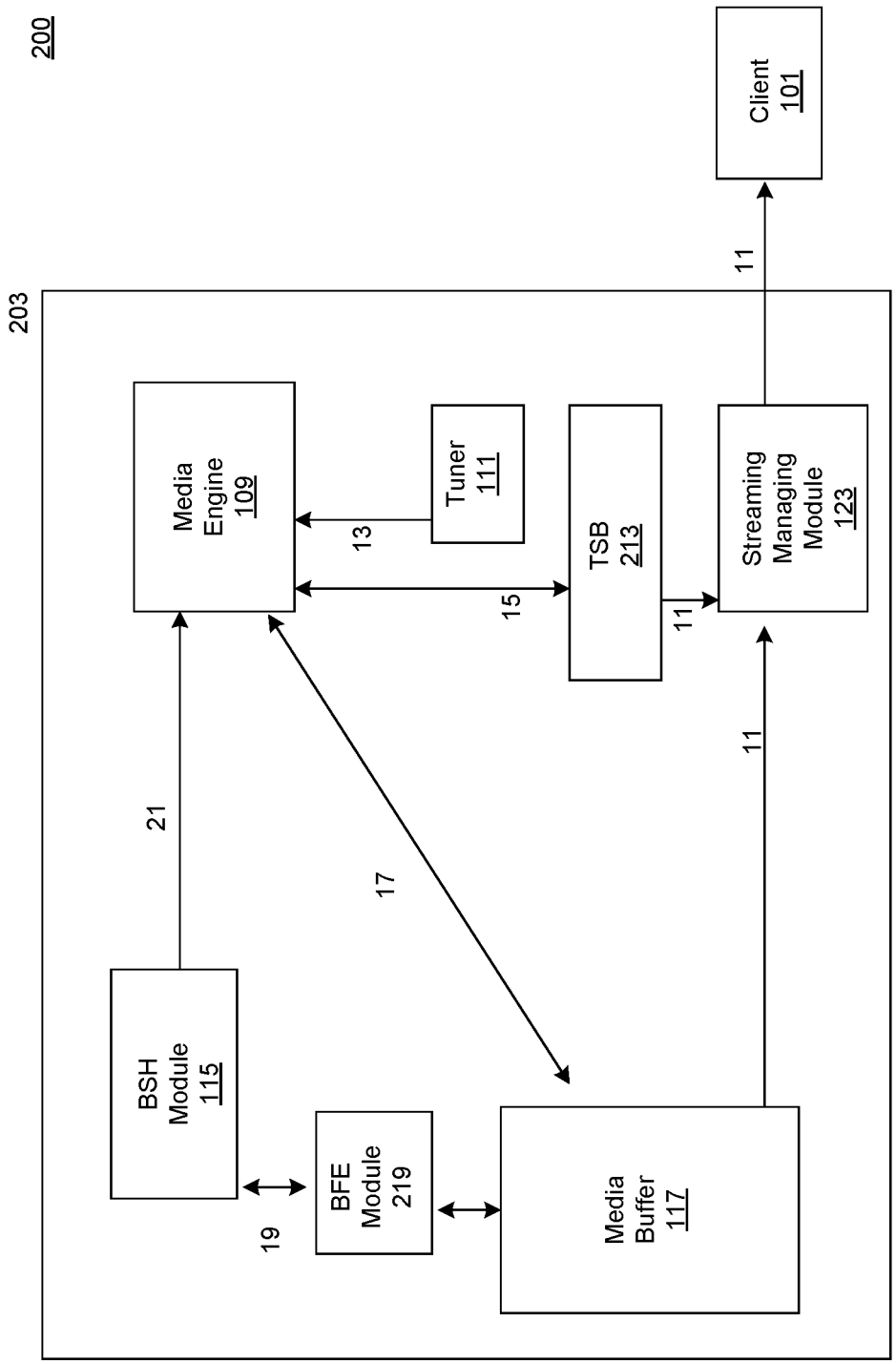
FIG. 2 is a schematic diagram illustrating a system for streaming in accordance with some implementations of the present disclosure.

FIG. 2 is a schematic diagram illustrating a system 200 for streaming in accordance with some implementations of the present disclosure. The system 200 includes a client device 101 in communication with a streaming server 203. The client device 101 is configured to receive streaming data 11 from the streaming server 203. In some embodiments, the streaming data 11 can include images, videos, pictures, etc., as well as other suitable, supplemental information associated with the images, such as descriptions, metadata, credits, sources, providers, links, descriptions, comments, etc.

The streaming server 203 includes a media engine 109, a tuner 111, a TSB (time shift buffer) 213, a BSH (buffer switch handler module 115, a media buffer 117, and a BFE (bitrate feedback extension) module 219. In some embodiments, the streaming server 103 can include a streaming managing module 123. The streaming managing module 123 is configured to interface and coordinate a streaming process with the client device 101.

The media engine 109 is configured to receive live streaming data 13 from the tuner 111 and DVR content 15 from the storage device 113. In some embodiments, the TSB 213 can be a hard disk drive (HDD) or a cloud drive. The media engine 109 is also configured to transcode buffered data 17 from the media buffer 117 so as to generate the streaming data 11 for streaming. In some embodiments, the BFE module 219 can be included in the media buffer 117. In some embodiments, the BFE module 219 can be independent from in the media buffer 117. The BFE module 219 can be is configured to set a bit rate for the media engine 109 based on a rate at which the streaming data 11 is consumed by the client device 101.

The BSH module 115 is configured to manage and/or update a media source (e.g., instructing the media engine 109 switch from the turner 111 to a new file location/position in the media buffer 117) for streaming in response to a triggering event. In some embodiments, the triggering event includes a network interruption, a slow network transmission, an event that a network transmission speed is lower than a threshold, an event that a network transmission speed variance exceeding a variance threshold.

In some embodiments, the BSH module 115 is also configured to manage and/or monitor a current bitrate 19 for the client device 101 from multiple media sources (e.g., buffered data in the media buffer 117) via the BFE module 119. It is advantageous to have the BFE module 119 to monitor the current bitrate 19 such that the system 100 can be adaptive to the current bitrate 19 (e.g., at run time based on a bandwidth of the client device 101. By such arrangement, the system 200 does not need to transcode with multiple bitrates, which can be challenging due to limited computing resources and storage spaces.

When the network condition is stable or good, the media buffer 117 stores transcoded data with fixed bitrate (e.g., 8 megabytes per second, Mbps). When the network condition is unstable (e.g., a drop of bandwidth, such as dropping to 1 Mbps), the media buffer 117 starts filling up faster because the media engine 109 keeps generating data at the original fixed rate (i.e., 8 Mbps) but the client device now only has a new bandwidth of pulling the data at a lower bitrate (i.e., 1 Mbps). The BFE module 119 can be configured to identify the foregoing bandwidth drop and send a request to the media engine 109 to start transcoding data at the lower bitrate (i.e., 1 Mbps).

When the client device 101 performs a live streaming, live input data is from the tuner 111. The tuner 111 can store the live input data in the TSB 213. The TSB 213 can be used to support pause/play/seek operations in the live streaming. During the live streaming, it is assumed that when a network bandwidth drop happens, the client device 101 is not able to pull the live input data at the current bitrate.

Instead of flushing out the buffered data in the media buffer 117, the BSH module 115 can switch the live streaming to the TSB at the same playback position (e.g., at the time when the network bandwidth drop happens). The BSH module 115 can send a request 21 to the media engine 109 to transcode the entire buffered data (in the media buffer 117) with a lower bitrate based on feedback from the BFE module 219. In some embodiments, the BSH module 115 can start transcoding data from the TSB from the last discontinued position (e.g., at the time when the network bandwidth drop happens). In some embodiments, the BSH module 115 can instruct the media engine 109 to start transcoding data from the TSB from the last discontinued position. By the foregoing arrangement, the existing buffered data (e.g., in the media buffer 117) is discarded but the same data is transcoded back from the TSB 213 accordingly to the current network bandwidth, such that a user of the client device 101 does not experience any data drop during livestreaming playback.

In some embodiments, the BSH module 115 monitors a flush situation of the media buffer 117 and handles upcoming data for transcoding. In some embodiments, the BSH module 115 can receive a transcode notification from the BFE module 119 with one or more of the following: a new transcode start PTS (Presentation Time Stamp), a new transcoding bitrate, etc. In some embodiments, the BFE module 119 can check the media buffer 117 for the new transcoding start PTS. In some embodiments, required data for transcoding can be found at, for example, (1) transcoded/buffered data in the media buffer 117; (2) data in the TSB 213; and/or (3) data from DVR files (e.g., stored in a storage device).

Figure 3:
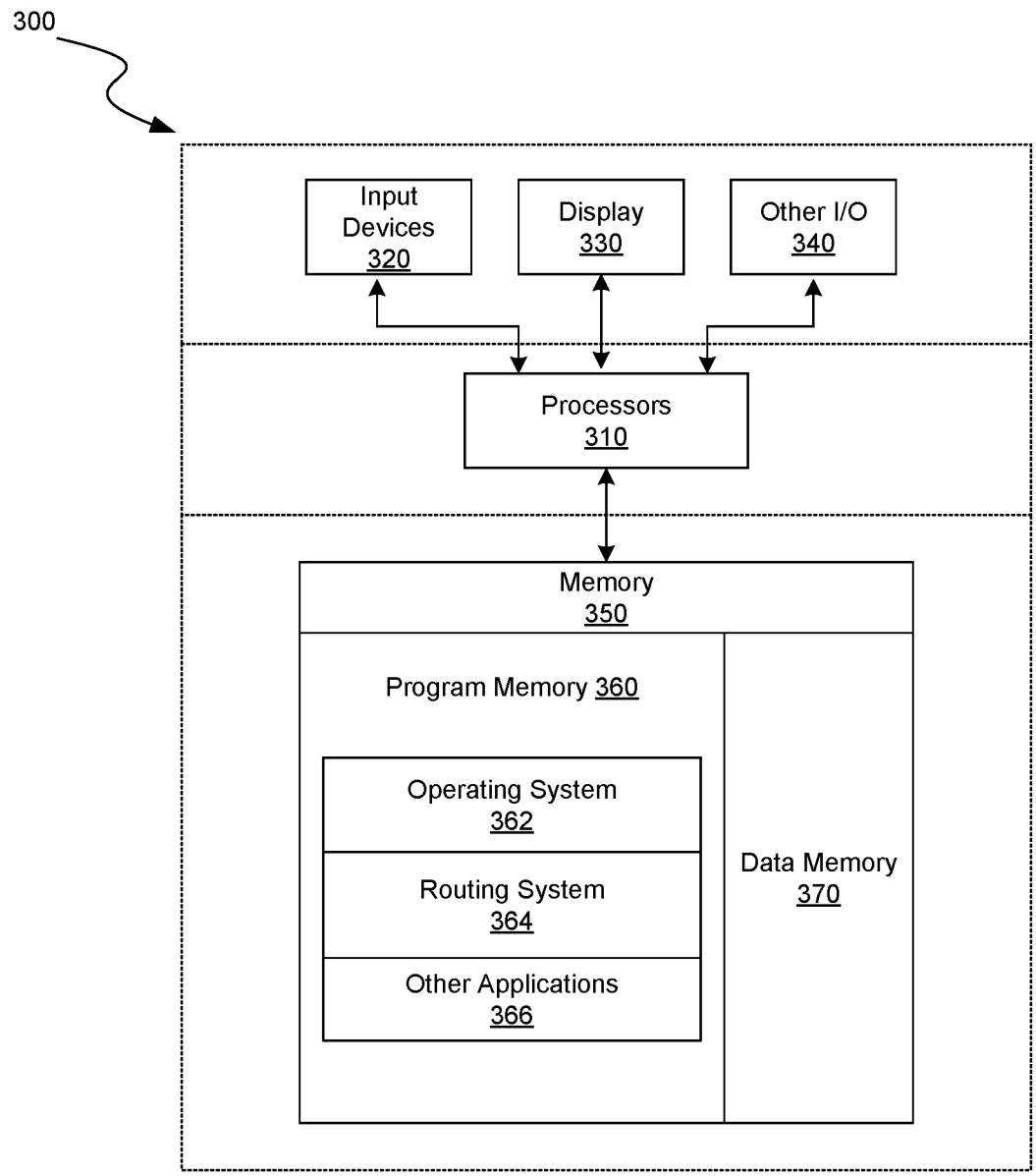
FIG. 3 is a block diagram illustrating an overview of devices on which some implementations can operate.

FIG. 3 is a block diagram illustrating an overview of devices (e.g., the streaming server 103/203, the client device 101, etc.) on which some implementations can operate. Device 300 can include one or more input devices 320 that provide input to the processor(s) 310 (e.g., CPU(s), GPU(s), etc.), notifying it of actions. The actions can be mediated by a hardware controller that interprets the signals received from the input device and communicates the information to the processors 310 using a communication protocol. Input devices 320 include, for example, a mouse, a keyboard, a touchscreen, an infrared sensor, a touchpad, a wearable input device, a camera- or image-based input device, a microphone, or other user input devices.

Processors 310 can be a single processing unit or multiple processing units in a device or distributed across multiple devices. Processors 310 can be coupled to other hardware devices, for example, with the use of a bus, such as a PCI bus or SCSI bus. The processors 310 can communicate with a hardware controller for devices, such as for a display 330. Display 330 can be used to display text and graphics. In some implementations, the display 330 provides graphical and textual visual feedback to a user. In some implementations, the display 330 includes the input device as part of the display, such as when the input device is a touchscreen or is equipped with an eye direction monitoring system. In some implementations, the display is separate from the input device. Examples of display devices include an LCD display screen, an LED display screen, a projected, holographic, or augmented reality display (such as a heads-up display device or a head-mounted device), and so on. Other I/O devices 340 can also be coupled to the processor, such as a network card, video card, audio card, USB, firewire or other external device, camera, printer, speakers, CD-ROM drive, DVD drive, disk drive, or Blu-Ray device.

In some implementations, the device 300 also includes a communication device capable of communicating wirelessly or wire-based with a network node. The communication device can communicate with another device or a server through a network using, for example, TCP/IP protocols. The device 300 can utilize the communication device to distribute operations across multiple network devices.

The processors 310 can have access to a memory 350 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 350 can include program memory 360 that stores programs and software, such as an operating system 362, routing system 364 (e.g., for implementing the routing plan discussed herein), and other application programs 366. The memory 350 can also include data memory 370, user interface data, event data, image data, biometric data, sensor data, device data, location data, network learning data, application data, alert data, structure data, camera data, retrieval data, management data, notification data, configuration data, settings, user options or preferences, etc., which can be provided to the program memory 360 or any element of the device 300.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 4:
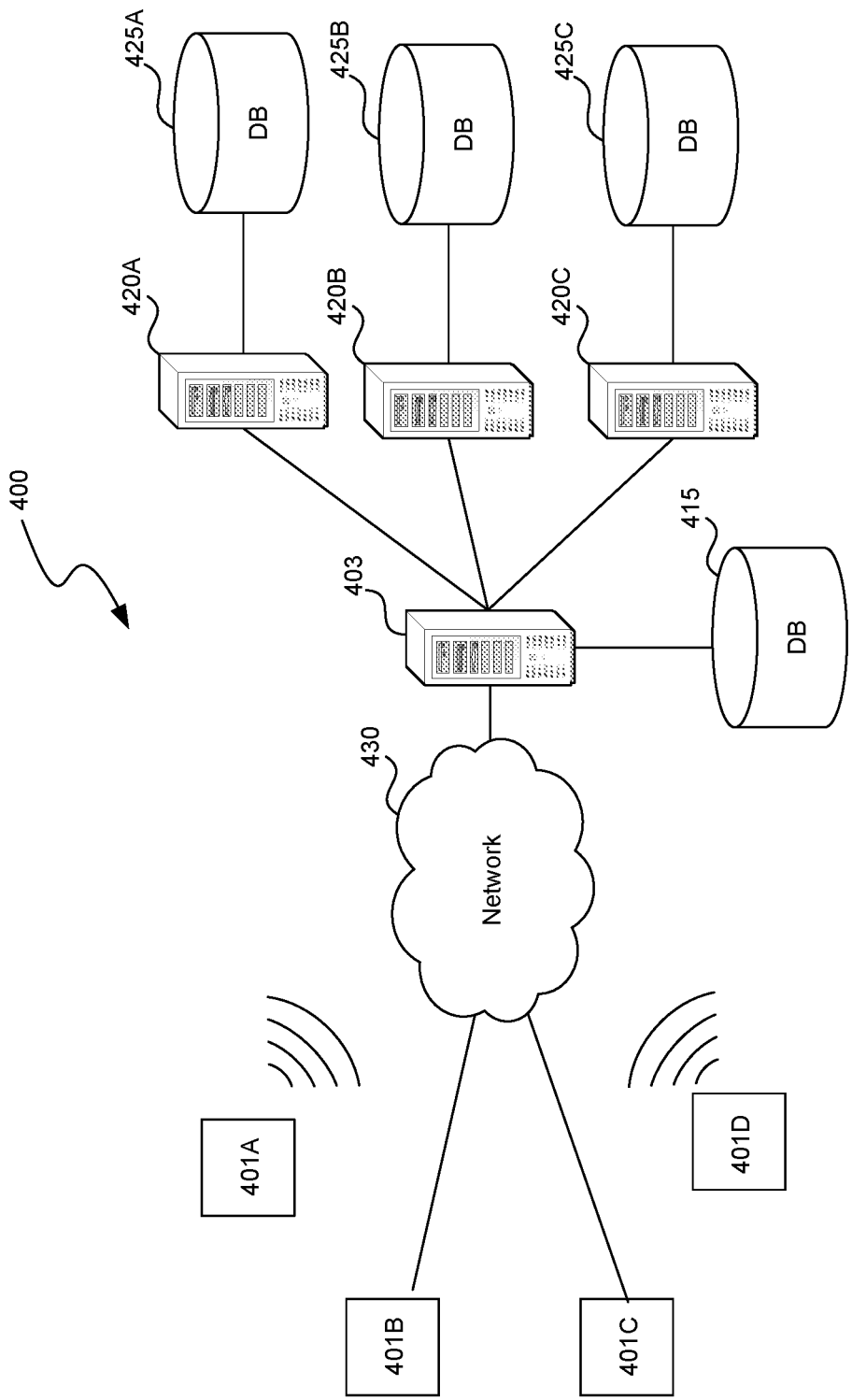
FIG. 4 is a block diagram illustrating an overview of an environment in which some implementations can operate.

FIG. 4 is a block diagram illustrating an overview of an environment 400 in which some implementations can operate. The environment 400 can include one or more client computing devices 401A-D, examples of which can include the client device 101. The client computing devices 401 can operate in a networked environment using logical connections through network 430 to one or more remote computers, such as a server computing device 403.

In some implementations, the server computing device 403 can be an edge server which receives client requests and coordinates fulfillment of those requests through other servers, such as servers 420A-C. Server computing devices 403 and 420 can comprise computing systems, such as the device 300 discussed above. Though each server computing device 403 and 420 is displayed logically as a single server, server computing devices can each be a distributed computing environment encompassing multiple computing devices located at the same or at geographically disparate physical locations. In some implementations, each server 420 corresponds to a group of servers.

The client computing devices 401 and the server computing devices 403 and 420 can each act as a server or client to other server/client devices. Server 403 can connect to a database 415. Servers 420A-C can each connect to a corresponding database 425A-C. As discussed above, each server 420 can correspond to a group of servers, and each of these servers can share a database or can have their own databases.

The databases 415/425 can store information such as implement data, user interface data, event data, image data, detection data, biometric data, sensor data, device data, location data, network learning data, application data, alert data, structure data, camera data, retrieval data, management data, notification data, configuration data. Though databases 415/425 are displayed logically as single units, databases 415 and 425 can each be a distributed computing environment encompassing multiple computing devices, can be located within their corresponding server, or can be located at the same or at geographically disparate physical locations.

Network 430 can be a local area network (LAN) or a wide area network (WAN), but can also be other wired or wireless networks. The network 430 may be the Internet or some other public or private network. The client computing devices 401 can be connected to the network 430 through a network interface, such as by wired or wireless communication. While the connections between server 403 and servers 420 are shown as separate connections, these connections can be any kind of local, wide area, wired, or wireless network, including network 430 or a separate public or private network.

Figure 5:
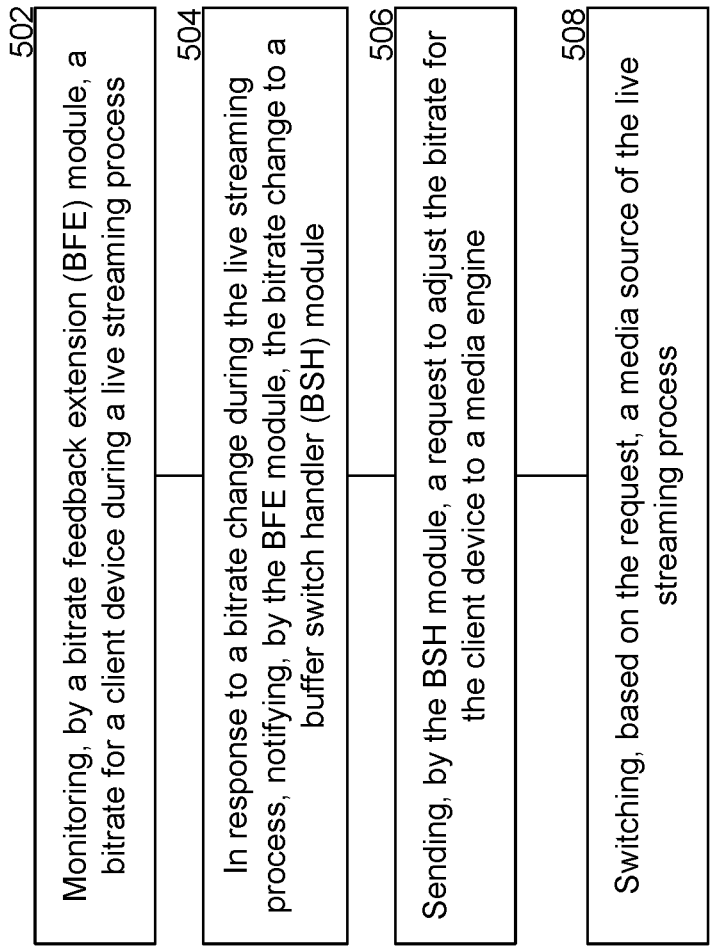
FIGS. 5-8 are flow diagrams illustrating processes in some implementations in accordance with the present disclosure.

FIG. 5 is a flow diagram illustrating a method 500 used in some implementations for managing image information associated with an item of interests. In some embodiments, the method 500 can be implemented by a sever (e.g., the streaming server 103/203) discussed herein.

At block 502, the method 500 start by monitoring, by a bitrate feedback extension (BFE) module, a bitrate (e.g., 8 Mbps, 20 Mbps, etc.) for a client device during a live streaming process. In some embodiments, the BFE module can be a set of executable instructions stored in a device/component. In some embodiments, the BFE module can be a component with firmware installed.

At block 504, the method 500 can continue by, in response to a bitrate change during the live streaming process, notifying, by the BFE module, the bitrate change to a buffer switch handler (BSH) module. In some embodiments, the bitrate change can include a bitrate dropping to a pre-determined amount (e.g., 1 Mbps) or a birate difference greater than a threshold. For example, the threshold can be 3 Mbps. Accordingly, a drop from 10 Mbps to 8 Mbps does not qualify as the bitrate change, where as a drop from 8 Mbps to 4 Mbps does qualify as the bitrate change. In some embodiments, the BSH module can be a set of executable instructions stored in a device/component. In some embodiments, the BSH module can be a component with firmware installed.

At block 506, the method 500 continues by sending, by the BSH module, a request to adjust the bitrate for the client device to a media engine. Embodiments of the request can be the request 21 discussed with reference to FIGS. 1 and 2.

At block 508, the method 500 continues by switching, based on the request, a media source of the live streaming process. Examples of the media sources include a media buffer (e.g., the media buffer 117), a tuner (e.g., the tuner 111), a storage device (the storage device 113), or an external source (e.g., the database 107).

In some embodiments, the method 500 further comprises switching the media source from a tuner to a time shift buffer (TSB). In some embodiments, the TSB can be a hard disk drive (HDD), a cloud drive, etc.

In some embodiments, the method 500 further comprises switching the media source from a tuner to an image file. In some embodiments, the image file can be a digital video recorder (DVR) file. In some embodiments, the imager file can be stored in a media buffer. In some embodiments, the method 500 further comprises switching the media source of the live steaming process from the turner to a new file location.

In some embodiments, the method 500 further comprises instructing the media engine to transcode buffered data in a media buffer at a lower bitrate. In some embodiments, the lower bitrate is determined based on the bitrate change during the live streaming process (e.g., adaptive to the current bitrate of a client device in the live streaming process).

Figure 6:
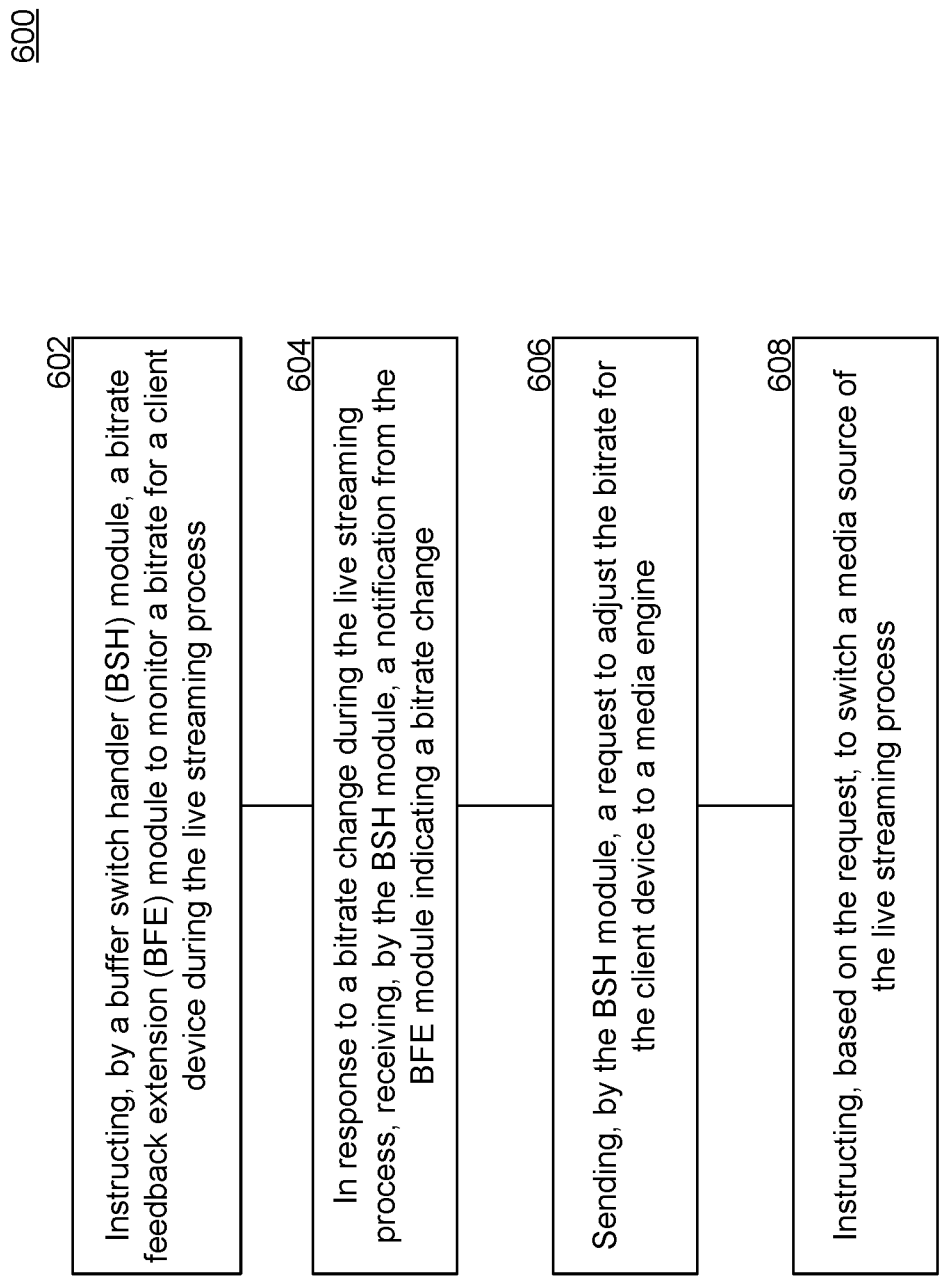

FIG. 6 is a schematic diagram illustrating a method 600 for performing a live streaming process. The method 600 can be implemented by a module (e.g., a buffer switch handler (BSH) module) in a streaming server (e.g., the streaming server 103/203).

At block 602, the method 600 continues by instructing a bitrate feedback extension (BFE) module to monitor a bitrate for a client device during the live streaming process. At block 604, the method 600 proceeds by, in response to a bitrate change during the live streaming process, receiving a notification from the BFE module indicating a bitrate change. At block 606, the method 600 continues by sending a request to adjust the bitrate for the client device to a media engine. At block 608, the method 600 continues by instructing, based on the request, to switch a media source of the live streaming process.

In some embodiments, the method 600 further comprises switching the media source from a tuner to a time shift buffer (TSB). In some examples, the TSB can be a hard disk drive (HDD), a cloud drive, etc.

In some embodiments, the method 600 further comprises switching the media source from a tuner to an image file. In some implementations, the image file can be a digital video recorder (DVR) file. In some examples, the imager file can be stored in a media buffer.

In some embodiments, the method 600 further comprises instructing the media engine to transcode buffered data in a media buffer at a lower bitrate. In some embodiments, the lower bitrate is determined based on the bitrate change during the live streaming process.

Figure 7:
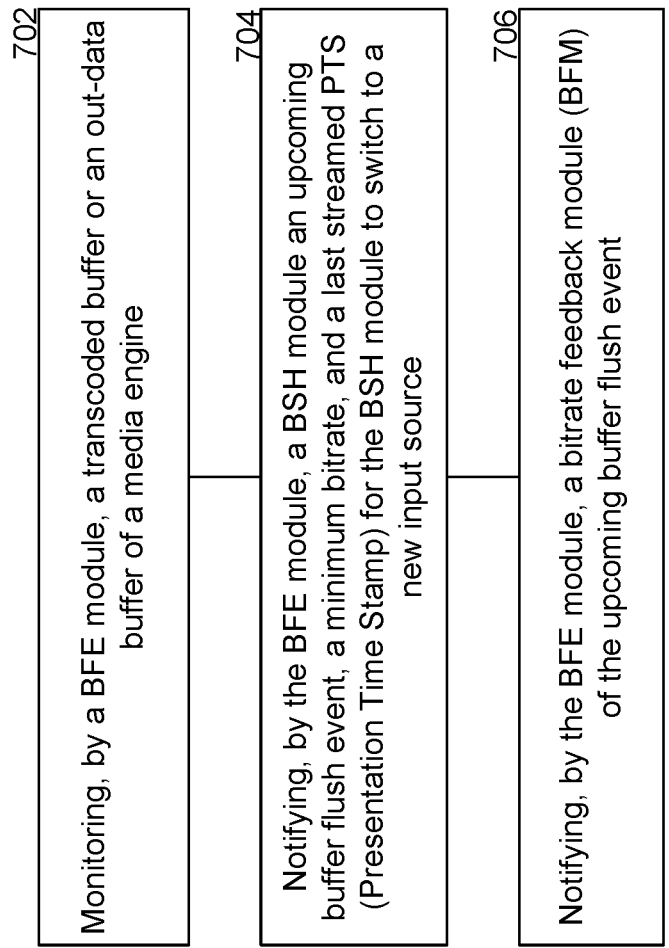

FIG. 7 is a schematic diagram illustrating a method 700 for performing a live streaming process. The method 700 can be implemented by a module (e.g., a buffer feedback extension (BFE) module) in a streaming server (e.g., the streaming server 103/203).

At block 702, the method 700 starts by monitoring, by a BFE module, a transcoded buffer (e.g., the media buffer 107) or an out-data buffer (e.g., the out-data buffer) of a media engine (e.g., media engine 109).

At block 704, the method 700 continues by, notifying, by the BFE module, a buffer switch handler (BSH) module an upcoming buffer flush event (or a buffer overflow event), a minimum bitrate, and a last streamed PTS (Presentation Time Stamp) for the BSH module to switch to a new input source (e.g., from a tuner to a live TSB or DVR file new position). By this notification, the system is aware of the upcoming buffer flush or overflow event so it can pay more attention to recent data.

At block 706, the method 700 continues by notifying, by the BFE module, a bitrate feedback module (BFM) of the upcoming buffer flush event. The BFM module can then monitoring a network throttling mismatch event (e.g., the out-data buffer of the media engine is still available but the transcoded buffer is overflowed).

Figure 8:
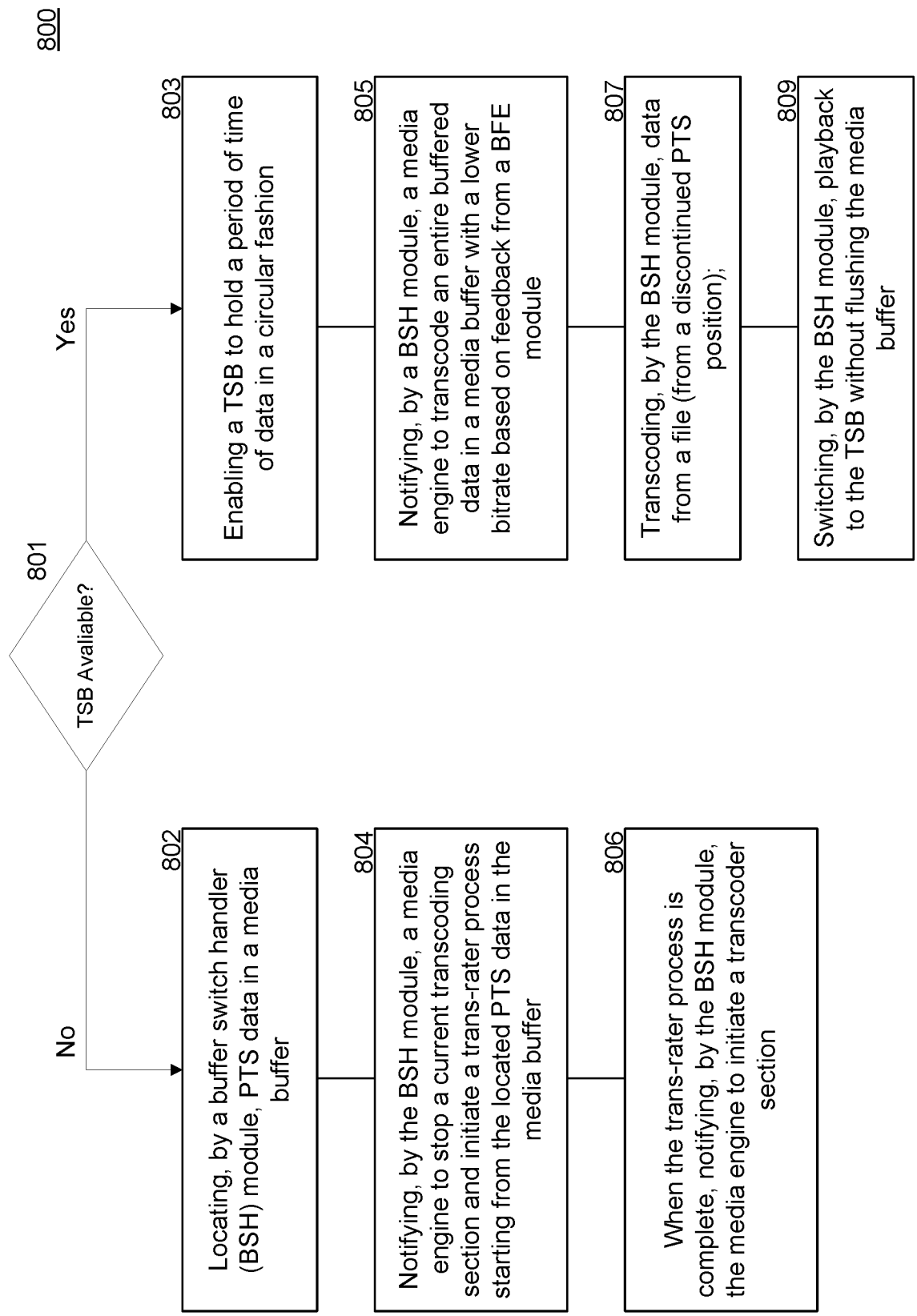

FIG. 8 is a schematic diagram illustrating a method 800 for performing a live streaming process. The method 800 can be implemented by a BSH module and a BFE module in a streaming server (e.g., the streaming server 103/203).

At decision block 801, the method 800 first determines whether a time shift buffer (TSB) is available. If so, the process goes to block 802; if not the process goes to block 803.

Live Streaming Without TSB (Blocks 802, 804, and 806)

At block 802, the method 800 continues by locating, by the BSH module, PTS (Presentation Time Stamp) data in a media buffer (e.g., the media buffer 117). In some embodiments, the PTS data includes the new transcode start PTS and associated information). At block 804, the method 800 continues by, notifying, the BSH module, a media engine to stop a current transcoding section and initiate a trans-rater process starting from the located PTS data in the media buffer. At block 806, the method 800 continues by notifying, by the BSH module, the media engine to initiate a transcoder section when the trans-rater process is complete.

Live Streaming with TSB (Blocks 803, 805, 807, and 809)

At block 803, the method 800 continues by enabling a TSB to hold a period of time of data in a circular fashion. At block 805, the method 800 continues by notifying, by a BSH module, a media engine to transcode an entire buffered data in a media buffer with a lower bitrate based on feedback from a BFE module. At block 807, the method 800 continues by transcoding, by the BSH module, data from a file (from a discontinued PTS position). At block 809, the method 800 continues by switching, by the BSH module, playback to the TSB without flushing the media buffer.

Those skilled in the art will appreciate that the components illustrated in FIGS. 1-8 described above, and in each of the flow diagrams discussed below, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described below.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Unless explicitly excluded, the use of the singular to describe a component, structure, or operation does not exclude the use of plural such components, structures, or operations. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, the expression "at least one of A, B, and C" is intended to cover all permutations of A, B and C. For example, that expression covers the presentation of at least one A, the presentation of at least one B, the presentation of at least one C, the presentation of at least one A and at least one B, the presentation of at least one A and at least one C, the presentation of at least one B and at least one C, and the presentation of at least one A and at least one B and at least one C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method, comprising:
   determining if a time shift buffer (TSB) is available;
   in an event that the TSB is available, enabling the TSB to hold data in a circular fashion;
   monitoring, by a bitrate feedback extension (BFE) module, a streaming bitrate for a client device during a live streaming process;
   notifying, by a buffer switch handler (BSH) module, a media engine to transcode buffered data in a media buffer in a lower bitrate compared to the streaming bitrate;
   in response to a change of the streaming bitrate during the live streaming process, notifying, by the BFE module, the change to the BSH module;
   sending, by the BSH module, a request to adjust the streaming bitrate for the client device to the media engine; and
   switching, based on the request, a media source of the live streaming process.

2. The method of claim 1, further comprising switching the media source from a tuner to the TSB.

3. The method of claim 2, wherein the TSB includes a hard disk drive (HDD) or a cloud drive.

4. The method of claim 1, wherein the BSH module is configured to locate presentation-time-stamp (PTS) data in a media buffer, and wherein the BSH module is configured to notify the media engine to stop a current transcoding session and initiate a trans-rater process starting from the located PTS data in the media buffer.

5. The method of claim 1, further comprising switching the media source from a tuner to an image file.

6. The method of claim 5, wherein the image file is a digital video recorder (DVR) file.

7. The method of claim 5, wherein the image file is stored in a media buffer.

8. The method of claim 1, further comprising switching the media source of the live steaming process from the turner to a new file location.

9. The method of claim 1, further comprising instructing the media engine to transcode buffered data in a media buffer at a lower bitrate, and wherein the lower bitrate is determined based on the bitrate change during the live streaming process.

10. The method of claim 9, wherein the BSH module is configured to notify the media engine to transcode an entire buffered data in the media buffer with the lower bitrate based on feedback from the BFE module.

11. A method for performing a live streaming process, comprising:
    determining if a time shift buffer (TSB) is available;
    in an event that the TSB is available, enabling the TSB to hold data in a circular fashion;
    instructing, by a buffer switch handler (BSH) module, a streaming bitrate feedback extension (BFE) module to monitor a bitrate for a client device during the live streaming process;
    notifying, by the BSH module, a media engine to transcode buffered data in a media buffer in a lower bitrate compared to the streaming bitrate;
    in response to a change of the streaming bitrate during the live streaming process, receiving, by the BSH module, a notification from the BFE module indicating the change;
    sending, by the BSH module, a request to adjust the streaming bitrate for the client device to the media engine; and
    instructing, based on the request, to switch a media source of the live streaming process.

12. The method of claim 11, further comprising switching the media source from a tuner to a time shift buffer (TSB).

13. The method of claim 12, wherein the TSB includes a hard disk drive (HDD) or a cloud drive.

14. The method of claim 11, wherein the BSH module is configured to locate presentation-time-stamp (PTS) data in a media buffer, and wherein the BSH module is configured to notify the media engine to stop a current transcoding session and initiate a trans-rater process starting from the located PTS data in the media buffer.

15. The method of claim 11, further comprising switching the media source from a tuner to an image file.

16. The method of claim 15, wherein the image file is a digital video recorder (DVR) file, and wherein the image file is stored in a media buffer.

17. The method of claim 11, further comprising instructing the media engine to transcode buffered data in the media buffer at the lower bitrate.

18. The method of claim 11, wherein the BSH module is configured to notify the media engine to transcode an entire buffered data in the media buffer with the lower bitrate based on feedback from the BFE module.

19. The method of claim 18, wherein the lower bitrate is determined based on the bitrate change during the live streaming process.

20. A computing system comprising:
    at least one processor; and
    at least one memory storing instructions that, when executed by the processor, cause the computing system to perform a process comprising:
    determining if a time shift buffer (TSB) is available;
    in an event that the TSB is available, enabling the TSB to hold data in a circular fashion;
    monitoring a streaming bitrate for a client device during a live streaming process;
    notifying, by a buffer switch handler (BSH) module, a media engine to transcode buffered data in a media buffer in a lower bitrate compared to the streaming bitrate;
    in response to a change of the streaming bitrate during the live streaming process, notifying the bitrate change to the BSH module;
    sending a request to adjust the streaming bitrate for the client device to the media engine; and
    switching, based on the request, a media source of the live streaming process.

* * * * *